US012793450B2

(12) United States Patent
Hong et al.

(10) Patent No.: US 12,793,450 B2
(45) Date of Patent: Nov. 10, 2026

(54) METHOD FOR ANNOTATION BASED ON LIDAR MAP AND COMPUTING DEVICE USING THE SAME

(71) Applicant: StradVision, Inc., Pohang-si (KR)

(72) Inventors: Ingee Hong, Seoul (KR); Jinwook Lee, Seoul (KR); Dong Kyu Yu, Yongin-si (KR)

(73) Assignee: StradVision, Inc., Pohang-Si (KR)

( * ) Notice: Subject to any disclaimer, the term of this patent is extended or adjusted under 35 U.S.C. 154(b) by 489 days.

(21) Appl. No.: 18/396,505

(22) Filed: Dec. 26, 2023

(65) Prior Publication Data

US 2025/0209839 A1 Jun. 26, 2025

(30) Foreign Application Priority Data

Dec. 21, 2023 (KR) ........................ 10-2023-0189016

(51) Int. Cl.

| | |
|---|---|
| ***G06V 20/00*** | (2022.01) |
| ***G06T 7/246*** | (2017.01) |
| ***G06T 7/73*** | (2017.01) |
| ***G06V 20/70*** | (2022.01) |

(52) U.S. Cl.

CPC .............. *G06V 20/70* (2022.01); *G06T 7/246* (2017.01); *G06T 7/73* (2017.01); *G06T 2207/10028* (2013.01); *G06T 2207/30241* (2013.01); *G06T 2207/30264* (2013.01)

(58) Field of Classification Search

CPC ..... G06T 2207/10028; G06T 2219/004; G06T 2207/30252; G06T 19/003; G06T 2207/10016; G06T 2207/30241; G06T 2207/20084; G06V 20/58; G06V 10/774;

(Continued)

(56) References Cited

U.S. PATENT DOCUMENTS

| | | | | |
|---|---|---|---|---|
| 10,891,518 | B1 * | 1/2021 | Joshi | G06N 20/20 |
| 2021/0142077 | A1 | 5/2021 | Cox et al. | |
| 2022/0153310 | A1 * | 5/2022 | Yang | B60W 60/0027 |

(Continued)

FOREIGN PATENT DOCUMENTS

| | | |
|---|---|---|
| CN | 109816686 A | 5/2019 |
| CN | 114973050 A | 8/2022 |

(Continued)

OTHER PUBLICATIONS

Wang, Bernie, et al. "Latte: accelerating lidar point cloud annotation via sensor fusion, one-click annotation, and tracking." 2019 IEEE Intelligent Transportation Systems Conference (ITSC). IEEE, 2019.*

(Continued)

*Primary Examiner* — Li Liu

(74) *Attorney, Agent, or Firm* — Kaplan Breyer Schwarz, LLP

(57) ABSTRACT

A method for annotation based on a LiDAR map, includes steps of: (a) generating, by a computing device, the LiDAR map and a key frame trajectory using LiDAR point cloud data and a LIDAR SLAM algorithm; (b) annotating, by the computing device, a plurality of key frames included in the key frame trajectory, thereby generating annotation result data; and (c) cumulatively recording, by the computing device, the annotation result data in the LiDAR map.

20 Claims, 11 Drawing Sheets
(4 of 11 Drawing Sheet(s) Filed in Color)

(58) Field of Classification Search
CPC ...... G06V 20/56; G06V 20/647; G06V 20/70; G06N 20/00
See application file for complete search history.

(56) References Cited

U.S. PATENT DOCUMENTS

| | | | |
|---|---|---|---|
| 2022/0277193 | A1 | 9/2022 | Wekel et al. |
| 2023/0059897 | A1 | 2/2023 | Miucic et al. |
| 2023/0129620 | A1 | 4/2023 | Kolagheichi-Ganjineh et al. |
| 2023/0237810 | A1 | 7/2023 | Roedler et al. |

FOREIGN PATENT DOCUMENTS

| | | | |
|---|---|---|---|
| DE | 102022104026 | A1 | 9/2022 |
| JP | 2020-516853 | A | 6/2020 |
| JP | 2020-177364 | A | 10/2020 |
| JP | 2022-132075 | A | 9/2022 |
| JP | 2022-161105 | A | 10/2022 |
| JP | 2023-548749 | A | 11/2023 |
| KR | 10-2343042 | B1 | 12/2021 |

OTHER PUBLICATIONS

Zhao, Junhao, et al. "SemanticFlow: Semantic segmentation of sequential LiDAR point clouds from sparse frame annotations." IEEE Transactions on Geoscience and Remote Sensing 61 (2023): 1-11.*

Notice of Reasons for Refusal issued in JP Patent Application No. 2024-213351, Jan. 7, 2025, Machine translation, 11 pp. w/ translation.

CVAT Video, https://www.cvat.ai/post/3d-point-cloud-annotation , Uploaded on date: Feb. 24, 2023.

Extended European Search Report issued in European Patent Application No. 24213872, 9 pp.

Wesley Chen et al, "ReBound: An Open-Source 30 Bounding Box Annotation Tool for Active Learning", Mar 11, 2023, arxiv.org, Cornell University Library, 201 Olin Library Cornell University Ithaca, NY, XP091458830, 6 pp.

Xiao Jianxiong et al, "SUN3D: A Database of Big Spaces Reconstructed Using SfM and Object Labels", Proceedings of the IEEE International Conference on Computer Vision (ICCV), IEEE, Dec. 1, 2013, DOI: 10.1109/ICCV.2013.458, pp. 1625-1632.

Zimmer Walter et al, "30 BAT: A Semi-Automatic, Web-based 30 Annotation Toolbox for Full-Surround, Multi-Modal Data Streams", 2019 IEEE Intelligent Vehicles Symposium (IV), IEEE, Jun 09, 2019, DOI: 10.1109/IVS.2019.8814071, pp. 1816-1821.

Office Action issued in related Korean patent application No. 10-2024-0155722, Jan. 20, 2025, 11 pp. w/ translation.

* cited by examiner

METHOD FOR ANNOTATION BASED ON LIDAR MAP AND COMPUTING DEVICE USING THE SAME

CROSS REFERENCE OF RELATED APPLICATION

The present application claims the benefit of the earlier filing date of Korean provisional patent application No. 10-2023-0189016, filed on Dec. 21, 2023, the entire contents of which are incorporated herein by reference.

FIELD OF THE DISCLOSURE

The present disclosure relates to a method and a computing device for annotation based on a LiDAR map.

BACKGROUND OF THE DISCLOSURE

Annotation is a process of labelling data to generate training data such that an artificial intelligence may be trained by using the training data.

Generally, the annotation should be done per frame. Therefore, repetitive annotating processes for a same target may decrease a speed thereof and a consistency of the annotation during the repetitive annotating processes may be difficult to be achieved, which result in a problem of a difficulty in achieving an efficiency of the annotation.

Further, there is another problem in that an annotation result may be reset on a next frame depending on an annotation tool. An example of the another problem is provided in the link below:

https://www.cvat.ai/post/3d-point-cloud-annotation).

Such annotation lacking the consistency may affect training processes, and therefore, a method of achieving the consistency and fast speed of the repetitive annotating processes is required to increase an amount of the training data.

SUMMARY OF THE DISCLOSURE

It is an object of the present disclosure to solve all the aforementioned problems.

It is still another object of the present disclosure to selectively choose key frames among all frames having been used to generate a LiDAR map and to perform annotation on the key frames, without annotating all the frames.

It is still another object of the present disclosure to simultaneously display both each of partial LiDAR maps and each of images corresponding to each of the key frames, thereby allowing annotating processes to be performed while referring to both the partial LiDAR maps and their corresponding images.

It is still yet another object of the present disclosure to cumulatively record each of annotation data for each of objects, thereby preventing repetitive annotating processes for each same object.

It is still yet another object of the present disclosure to generate an annotated LiDAR map where each of the objects included in the LiDAR map is annotated, thereby managing all the annotation data in the annotated LiDAR map.

In accordance with one aspect of the present disclosure, there is provided a method for annotation based on a LiDAR map, including steps of: (a) generating, by a computing device, a LiDAR map and a-key frame trajectory using LiDAR point cloud data and a LiDAR SLAM algorithm; (b) allowing, by the computing device, each of key frames included in the key frame trajectory to be annotated, thereby allowing annotation result data to be generated; and (c) cumulatively recording, by the computing device, the annotation result data in the LiDAR map.

As one example, the step of (b) includes steps of: (b1) the computing device selecting a t-th key frame among the plurality of key frames that are part of the key frame trajectory; (b2) the computing device allowing a t-th partial LiDAR map and one or more t-th image data corresponding to location information of the t-th key frame to be displayed; and (b3) the computing device allowing a t-th annotating process to be performed by referring to the t-th partial LiDAR map and the t-th image data; and wherein the steps of (b1) to (b3) are repeated while increasing t from 1 to n, wherein t is an integer, and n is a cardinal number of the key frames.

As one example, at the step of (c), the computing device converts coordinates of t-th annotation result data into coordinates of the t-th partial LiDAR map, to thereby generate and record converted t-th annotation result data.

In accordance with another aspect of the present disclosure, there is provided a computing device for annotation based on a LiDAR map, including: at least one memory that stores instructions; and at least one processor configured to execute the instructions to perform processes of (I) generating a LiDAR map and a key frame trajectory using LiDAR point cloud data and a LiDAR SLAM algorithm; (II) allowing each of key frames included in the key frame trajectory to be annotated, thereby allowing annotation result data to be generated; and (III) cumulatively recording the annotation result data in the LiDAR map.

As one example, the process of (II) includes processes of: (II-1) selecting a t-th key frame among the plurality of key frames that are part of the key frame trajectory; (II-2) allowing a t-th partial LiDAR map and one or more t-th image data corresponding to location information of the t-th key frame to be displayed; and (II-3) allowing a t-th annotating process to be performed by referring to the t-th partial LiDAR map and the t-th image data; and wherein the processes of (II-1) to (II-3) are repeated while increasing t from 1 to n, wherein t is an integer, and n is a cardinal number of the key frames.

As one example, at the process of (III), the processor converts coordinates of t-th annotation result data into coordinates of the t-th partial LiDAR map, to thereby generate and record converted t-th annotation result data.

In addition, recordable media that are readable by a computer for storing a computer program to execute the method of the present disclosure is further provided.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

Figure 1:
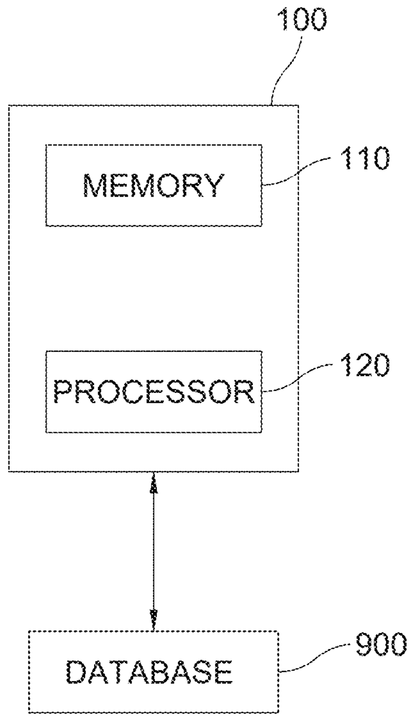

FIG. 1 is a drawing schematically illustrating a computing device for annotation based on a LiDAR map in accordance with one example embodiment of the present disclosure.

Figure 2:
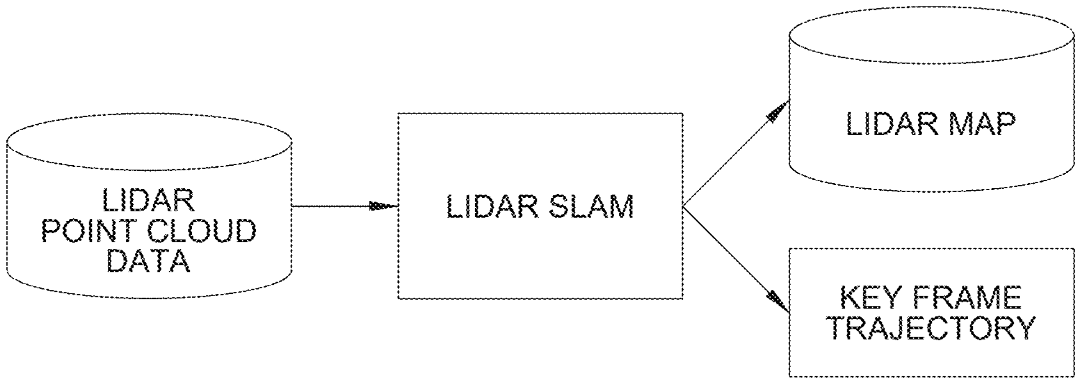

FIG. 2 is a drawing schematically illustrating a method for generating the LiDAR map and a key frame trajectory by using the computing device in accordance with one example embodiment of the present disclosure.

Figure 3A:
Figure 3B:
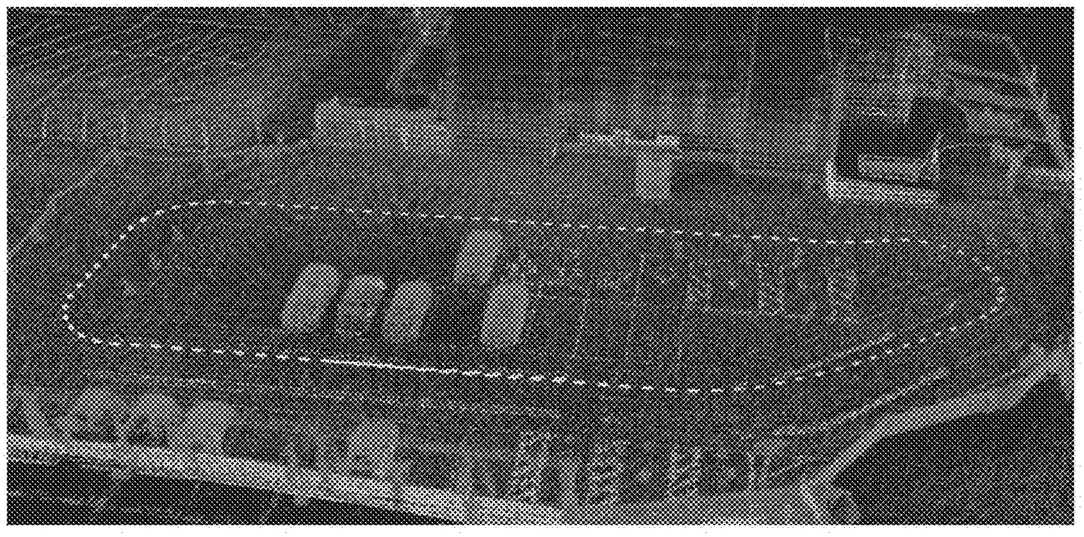

FIGS. 3A and 3B are drawings respectively illustrating a generated LiDAR map and a generated key frame trajectory in accordance with one example embodiment of the present disclosure.

Figure 4:
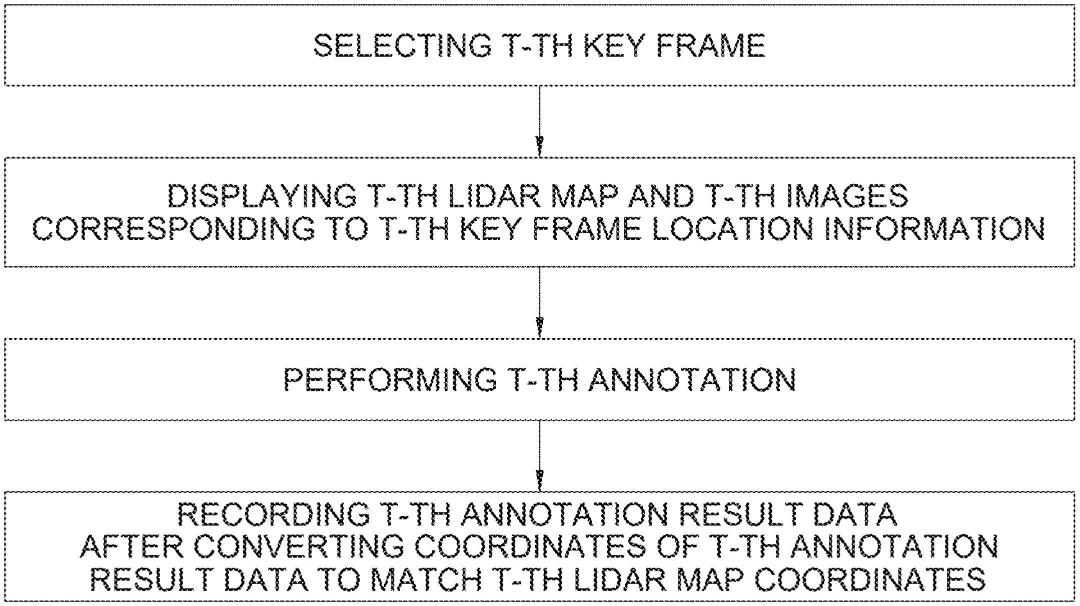

FIG. 4 is a drawing schematically illustrating a method of annotation by using the computing device in accordance with one example embodiment of the present disclosure.

FIGS. 5A, 5B, 5C, and 5D are drawings schematically illustrating examples of the method of annotation by using the computing device in accordance with one example embodiment of the present disclosure.

Figure 6A:
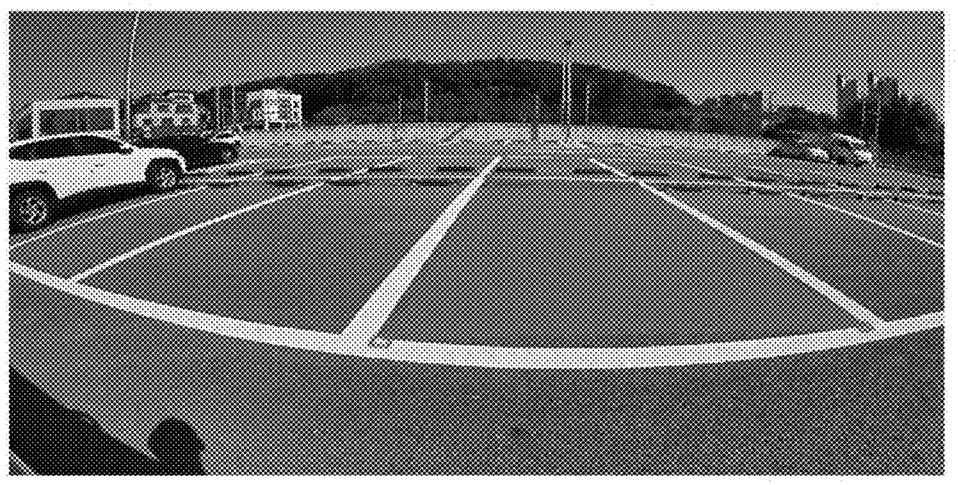
Figure 6B:
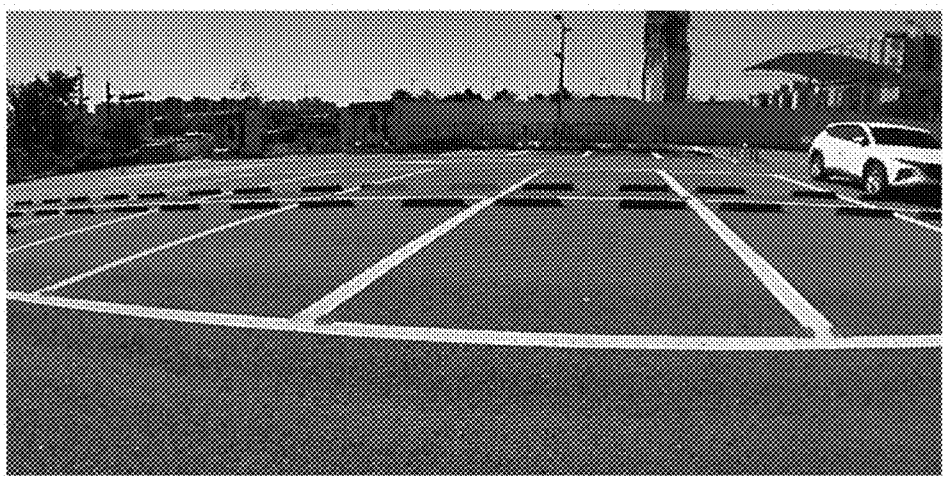

FIGS. 6A and 6B are drawings schematically illustrating other examples of the method of annotation by using the computing device in accordance with another example embodiment of the present disclosure.

DETAILED DESCRIPTION OF THE PREFERRED EMBODIMENTS

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

To allow those skilled in the art to the present disclosure to be carried out easily, the example embodiments of the present disclosure by referring to attached drawings will be explained in detail as shown below.

FIG. 1 is a drawing schematically illustrating a computing device for annotation based on a LiDAR map in accordance with one example embodiment of the present disclosure.

By referring to FIG. 1, the computing device 100 may include at least one memory 110 for storing instructions and a processor 120 for processing the instructions for the annotation based on the LiDAR map. Herein, the computing device 100 may be a PC or a mobile device, etc.

Specifically, the computing device 100 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

Also, the processors of such devices may include hardware configuration of MPU (Micro Processing Unit) or CPU (Central Processing Unit), cache memory, data bus, etc. Additionally, the computing device may further include operating system (OS) and software configuration of applications that achieve specific purposes.

Such description of the computing device does not exclude an integrated device including any combination of a processor, a memory, a medium, or any other computing components for implementing the present disclosure.

Moreover, the computing device 100 may communicate with a database 900 which stores information required for performing processes of the annotation based on the LiDAR map. Herein, the database 900 may include at least part of a flash memory type, a hard disk type, a multimedia card micro type, a card memory (such as SD or XD memory), RAM (Random Access Memory), SRAM (Statis Random Access Memory), ROM (ReadOnly Memory), EEPROM (Electrically Erasable Programmable ReadOnly Memory), PROM (Programmable ReadOnly Memory), magnetic memory, magnetic disk memory, and optical disk. Further, depending on an operating condition of the present disclosure, the database 900 may be installed separately from the computing device 100, or may be installed within the computing device 100 to transmit and record data, and may also be implemented separately into two or more DBs, contrary to the illustration.

A method using the computing device 100 for the annotation based on the LiDAR map in accordance with one example embodiment of the present disclosure is as follows.

Lidar Map Generation

FIG. 2 is a drawing schematically illustrating a method for generating a LiDAR map and a key frame trajectory by using the computing device 100 in accordance with one example embodiment of the present disclosure.

First, the computing device 100 may refer to dataset recorded in the database to thereby acquire LiDAR point cloud data.

Herein, the dataset may include LiDAR point cloud data collected every predetermined period by a LiDAR mounted on a vehicle driven along a predetermined path, and image data collected every predetermined period by one or more cameras installed on the vehicle.

Since the LiDAR point cloud data are 3D (3-Dimensional) data, and the image data are 2D (2-Dimensional) data, the LiDAR and the cameras may be calibrated with each other in order to match each other's coordinates.

Further, the computing device 100 may generate the LiDAR map and the key frame trajectory by using the LiDAR point cloud data through LiDAR SLAM (Simultaneous Localization and Mapping) algorithm.

Herein, the LiDAR SLAM algorithm may include ICP (Interactive Closet Point) algorithm, and HDL GRAPH SLAM algorithm, but it is not limited thereto.

Herein, the computing device 100 may select some part of frames as key frames from all LiDAR frames such that the key frame trajectory is generated by using the selected key frames.

Herein, the key frame trajectory may be a trajectory including each of sequential locations corresponding to each of the key frames.

It is to be appreciated that each of the LiDAR frames may correspond to each location information on the LiDAR map, which will be explained later.

Herein, the location information may include information on a point and an orientation of the vehicle on the LiDAR map, or may be a point and an orientation of the LiDAR on the LiDAR map, but it is not limited thereto.

Further, the location information may include information on 6-DOF (i.e., Six degrees of freedom) which are information on X, Y, Z, Roll, Pitch and Yaw.

Furthermore, the computing device 100 may select the key frames by using at least part of traveled distances and rotation angles, but it is not limited thereto. Herein, each of the traveled distances and each of the rotation angles may be determined by referring to each location information of each of LiDAR frames.

FIGS. 3A and 3B are drawings respectively illustrating the LiDAR map and the key frame trajectory in accordance with one example embodiment of the present disclosure.

Meanwhile, the computing device 100 may generate the LiDAR map by additionally using at least part of GPS sensor data and IMU sensor data acquired from a GPS sensor and an IMU sensor installed on the vehicle, to thereby increase a quality of the LiDAR map.

Also, if the LiDAR map is generated by using the GPS sensor data, even in case at least one of dates/times of acquiring the LiDAR data and the image data and surroundings of the LiDAR data and the image data is changed, the LiDAR data and the image data having already been acquired can be re-used.

Annotation

FIG. 4 is a drawing schematically illustrating the method of annotation by using the computing device 100 in accordance with one example embodiment of the present disclosure.

By referring to FIG. 4, the computing device 100 may select a t-th key frame from all the key frames.

Herein, t is an integer, and n is the number of the key frames.

Further, the computing device 100 may allow a t-th partial LiDAR map and its corresponding one or more t-th image data corresponding to the t-th key frame to be displayed.

Next, the computing device 100 may allow a t-th annotating process to be performed on at least one object included in the t-th partial LiDAR map by referring to the displayed t-th partial LiDAR map and the t-th image data.

Herein, if the object is a vehicle with a 3D volume, then a 3D bounding box with a shape of a cuboid capable of including the vehicle therein may be generated to annotate the vehicle, and if the object is a parking slot with a 2D region, then a 2D bounding box capable of including the parking slot therein may be generated to annotate the parking slot, but it is not limited thereto. It is to be appreciated that a shape of the bounding box of the present disclosure may include any quadrangle shape such as variations of a rectangle.

Further, the computer device 100 may allow intermediate data and/or result data of the t-th annotating process performed on the object(s) included in the t-th partial LiDAR map to be projected onto its corresponding t-th image data.

Herein, "projected" may mean that the intermediate data and/or the result data of the t-th annotating process are allowed to be displayed at specific coordinates of the t-th image data corresponding to specific coordinates of the t-th partial LiDAR map. The specific coordinates of the t-th partial LiDAR map represents a location of the object on the LiDAR coordinate system.

Next, the computing device 100 may convert coordinates of the t-th annotation result data into coordinates of the t-th partial LiDAR map, to thereby generate and record converted t-th annotation result data.

After that, the computing device 100 may allow a (t+1)-th key frame to be selected among all the key frames included in the key frame trajectory.

Further, the computing device 100 may allow a (t+1)-th partial LiDAR map and its corresponding one or more (t+1)-th image data corresponding to location information of a (t+1)-th key frame to be displayed (through a labelling worker's terminal).

Herein, the computing device 100 may convert the t-th annotation result data to be correctly located on the location information of the (t+1)-th key frame, and may allow the converted t-th annotation result data to be displayed on the (t+1)-th partial LiDAR map and the (t+1)-th image data.

Next, the computing device 100 may allow a (t+1)-th annotating process to be performed on at least one object that did not exist on the t-th partial LiDAR map among all objects included in the (t+1)-th partial LiDAR map by referring to at least part of the (t+1)-th partial LiDAR map and the (t+1)-th image data.

As such, the computing device 100 may allow a first annotating process to an n-th annotating process to be performed on a first key frame to an n-th key frame, and may cumulatively record a first annotation result to the n-th annotation result on the LiDAR map, thereby allowing management of all the annotated objects on the single LiDAR map.

Figure 5A:
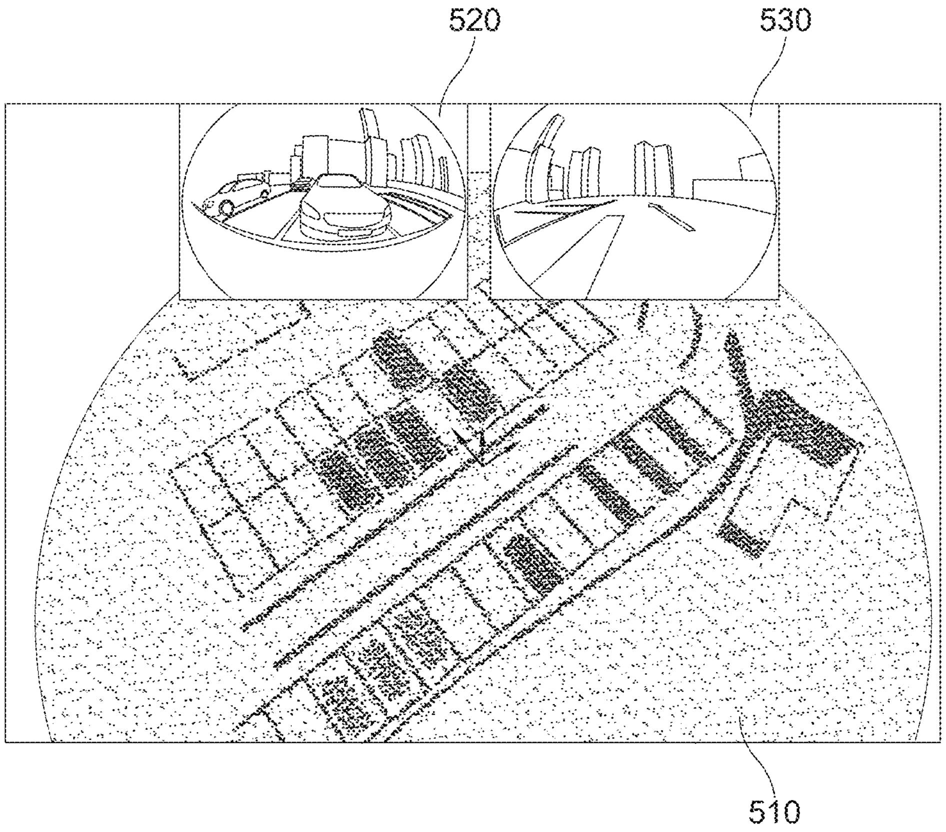
Figure 5B:
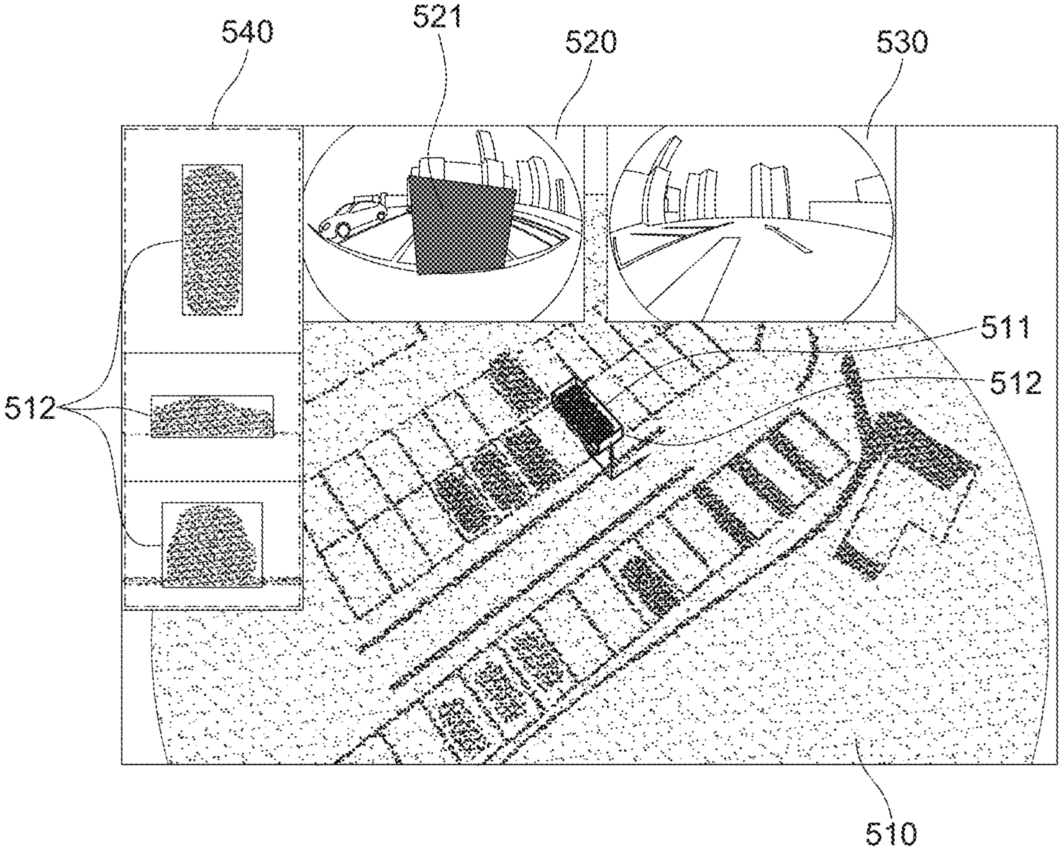
Figure 5C:
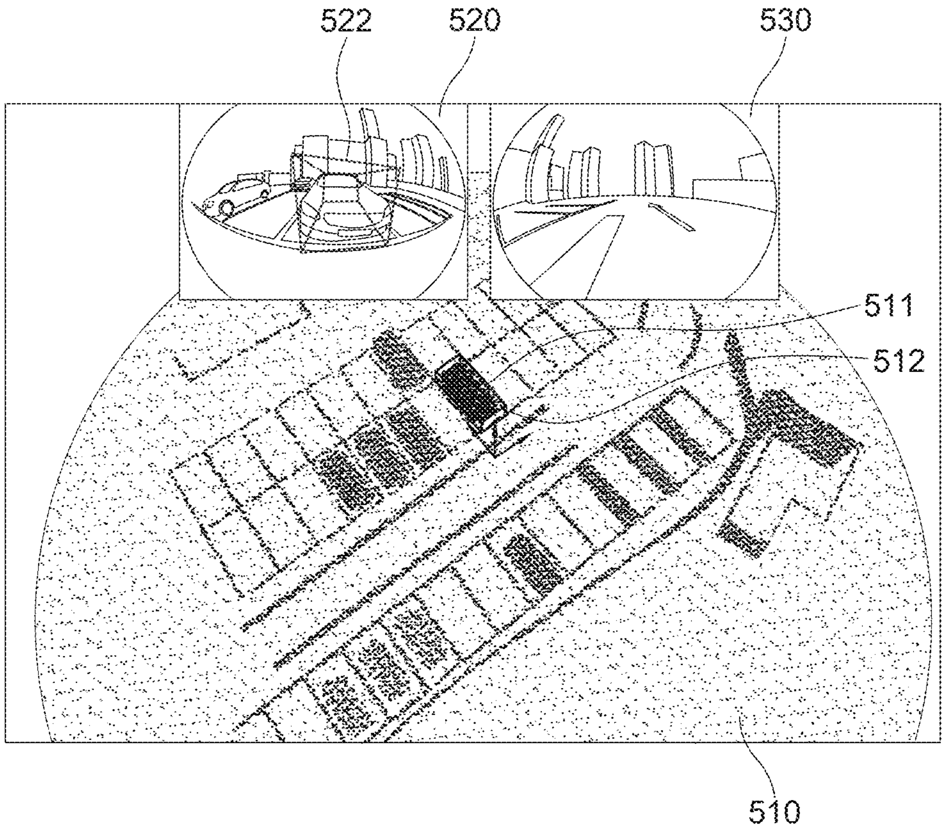
Figure 5D:
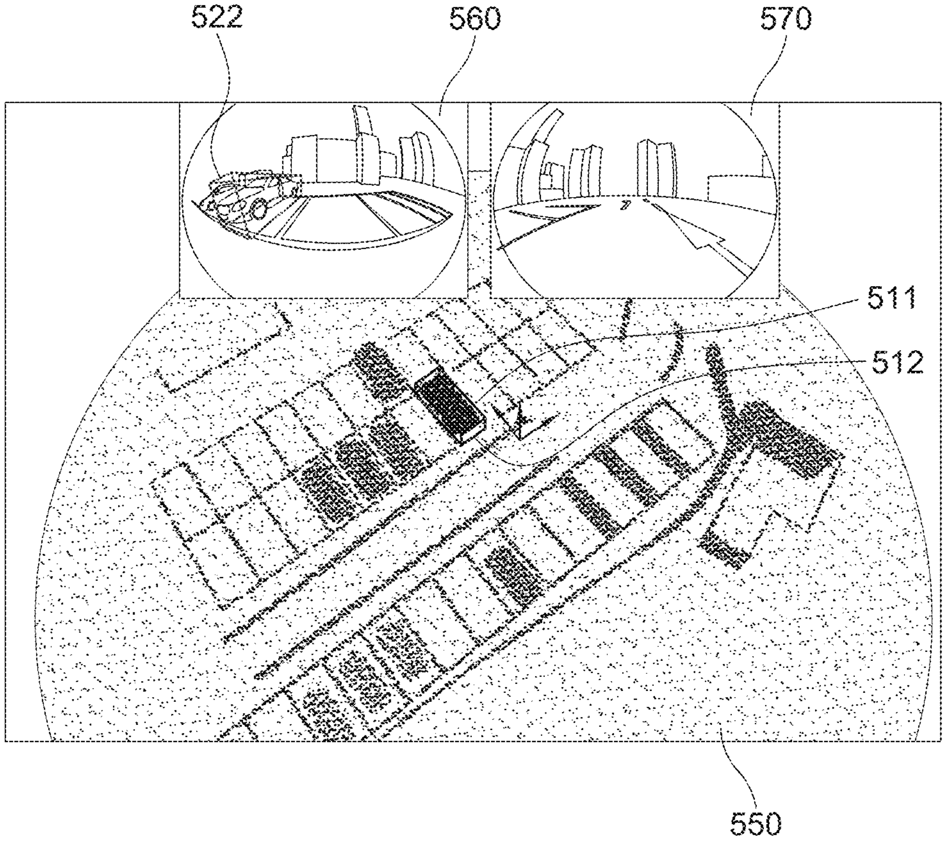

For example, by referring to FIGS. 5A to 5D, the annotation method will be exemplarily explained in detail. On the assumption that the t-th key frame is selected, the computing device 100 may allow the t-th partial LiDAR map 510 and the t-th image data 520 and 530 corresponding to the location information of the t-th key frame to be displayed as illustrated in FIG. 5A. Herein, it is assumed that the t-th partial LiDAR map 510 and the t-th image data 520 and 530 do not include previous annotation result data. Afterwards, as shown in FIG. 5B, the computing device 100 may allow a 3D bounding box 512 in the shape of a cuboid capable of including a specific car 511 therein (displayed on the t-th partial LiDAR map) to be generated. In addition, a bounding box 521 corresponding to the 3D bounding box 512 may be projected onto specific coordinates of the t-th image data 520 corresponding to specific coordinates of the 3D bounding box 512 on the t-th partial LiDAR map as illustrated in FIG. 5B. For reference, the bounding box 521 is shown to be opaque in FIG. 5B, but it is not limited thereto. Moreover, the computing device 100 may allow a magnified state of a top part, a side part, and a front part of the specific car 511 to be additionally displayed through an area 540, and may allow the 3D bounding box 512, i.e., the exact state of x, y, z, Roll, Pitch, and Yaw of the 3D bounding box 512, to be generated by further referring to the area 540, thereby increasing the accuracy of the annotation thereon. Following, as shown in FIG. 5C, upon the completion of the t-th annotating process by fitting the 3D bounding box 512 to the specific car 511, i.e., by setting the 3D bounding box 512 capable of including the specific car 511, the computing device 100 may convert coordinates of the t-th annotation result data of the specific car 511 into coordinates of the t-th partial LiDAR map 510, to thereby generate and record converted t-th annotation result data. While the 3D bounding box 512 is shown on the t-th partial LiDAR map 510, its corresponding 3D bounding box 522 is also shown on the t-th image data 520, as illustrated in FIG. 5C. Afterwards, on the assumption that the (t+1)-th key frame is selected, the computing device 100 may allow a (t+1)-th partial LiDAR map 550 where the 3D bounding box 512 is remained and (t+1)-th image data 560 where the 3D bounding box 522 is remained to be displayed through the labelling worker's terminal as illustrated in FIG. 5D.

As another example, by referring to FIGS. 6A and 6B, in case a purple area has been recorded as seventh annotation result data of a parking slot in a seventh key frame as illustrated in FIG. 6A, the seventh annotation result data in purple is also displayed in a 51-st image data corresponding to location information of a 51-st key frame, as illustrated in FIG. 6B.

The present disclosure has an effect of selectively choosing key frames among all the frames having been used to generate the LiDAR map and performing annotation on the key frames, without annotating all the frames.

The present disclosure has another effect of simultaneously displaying both each of the partial LiDAR maps and each of the image data corresponding to each of the key frames, thereby allowing each of annotating processes to be performed while referring to both each of the partial LiDAR maps and its corresponding image data.

The present disclosure has still another effect of cumulatively recording each of annotation data for each of the objects, thereby preventing repetitive annotating processes for each same object.

The present disclosure has still yet another effect of generating an annotated LiDAR map where each of the objects included in the LiDAR map is annotated, thereby managing all the annotation data in the annotated LiDAR map.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a compiler but also a high level language code that can be executed by a computer using an interpreter, etc. The hardware device can work as more than a software module to perform the process in accordance with the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for annotation based on a LiDAR map, comprising steps of:

(a) on condition that each of datasets for each of driving routes has been recorded in a database, in response to acquiring a specific dataset among the datasets, generating, by a computing device, a specific LiDAR map and a specific key frame trajectory using a plurality of specific LiDAR point cloud data included in the specific dataset, wherein each of the datasets includes (1) each of LiDAR point cloud data corresponding to each of LiDAR frames and (2) each of camera images corresponding to each of camera frames, acquired by a predetermined criterion while driving each of the driving routes; and (b) allowing, by the computing device, a specific key frame, which is at least part of a plurality of key frames included in the specific key frame trajectory, to be annotated, thereby generating an annotation result and thus recording the annotation result in the specific LiDAR map.

2. The method of claim 1, wherein, at the step of (a), the computing device selects at least part of a plurality of specific LiDAR frames as the plurality of key frames by referring to each location information of the plurality of specific LiDAR frames corresponding to the plurality of specific LiDAR point cloud data, and generates the key frame trajectory to be a path moving along the plurality of key frames.

3. The method of claim 2, wherein, at the step of (a), the computing device, for each of the specific LiDAR frames, performs at least one of sub-processes of: (i) determining whether a distance between a k-th point corresponding to a k-th specific LiDAR frame and a (k+1)-th point corresponding to a (k+1)-th specific LiDAR frame exceeds a preset threshold distance, and (ii) determining whether a pose change rate between a k-th pose corresponding to the k-th specific LiDAR frame and a (k+1)-th pose corresponding to the (k+1)-th specific LiDAR frame exceeds a present threshold pose change rate, to thereby select the plurality of key frames.

4. The method of claim 1, wherein the step of (b) includes steps of:

(b1) the computing device allowing a t-th key frame among the plurality of key frames that are part of the specific key frame trajectory to be selected as the specific key frame;

(b2) in response to selecting the t-th key frame, the computing device instructing a display device to display a t-th LiDAR map and one or more t-th camera images corresponding to location information of the t-th key frame;

(b3) the computing device allowing a t-th annotating process on said at least part of a plurality of objects included in the t-th LiDAR map to be performed by referring to at least one of the t-th LiDAR map and the t-th camera images; and (b4) the computing device converting coordinates of a t-th annotation result into coordinates of the t-th LiDAR map, to thereby generate a converted t-th annotation result and record the converted t-th annotation result in the specific LiDAR map.

5. The method of claim 4, wherein, at the step of (b3), in response to selecting a t-th object among the plurality of objects, the computing device generates a (t_1)-st annotation box with a certain range based on the t-th object, and then instructs the display device to display the (t_1)-st annotation box, to thereby allow the t-th annotating process on the t-th object to be performed.

6. The method of claim 5, wherein the computing device displays a (t_2)-nd annotation box corresponding to the (t_1)-st annotation box by projecting the (t_2)-nd annotation box on a region of the t-th camera image corresponding to a range of coordinates of the t-th LiDAR map where the (t_1)-st annotation box is located, wherein the computing device allows a second shape of the (t_2)-nd annotation box to be changed according to a change in a first shape of the (t_1)-st annotation box by referring to a relation between a (t_1)-st shooting angular range of the t-th LiDAR map and a (t_2)-nd shooting angular range of the t-th camera image.

7. The method of claim 5, wherein, in response to selecting the t-th object among the plurality of objects, the computing device instructs the display device to further display a detailed area in which at least one of a planar portion, a side portion, and a front portion of the t-th object is enlarged, wherein the computing device generates at least one (t_3)-rd annotation box in which at least one of a planar portion, a side portion and a front portion of the (t_1)-st annotation box is enlarged and instructs the display device to display the (t_3)-rd annotation box through the detailed area.

8. The method of claim 4, wherein, after the step (b4), the step of (b) includes steps of:

(b5) in response to selecting a (t+1)-th key frame, the computing device converting coordinates of the t-th annotation result, having been converted into coordinates of the t-th LiDAR map, into coordinates of the (t+1)-th LiDAR map, thereby generating a converted t-th annotation result, and then applying the converted t-th annotation result to the (t+1)-th LiDAR map, and instructing the display device to (1) display the (t+1)-th LiDAR map with the t-th annotation result applied thereto and (2) display the t-th annotation result on one or more (t+1)-th camera images by referring to a matching relation between the (t+1)-th LiDAR map and the (t+1)-th camera images;

(b6) the computing device allowing a (t+1)-th annotating process on said at least part of a plurality of objects included in the (t+1)-th LiDAR map to be performed by referring to at least one of the (t+1)-th LiDAR map and the (t+1)-th camera images; and (b7) the computing device converting coordinates of a (t+1)-th annotation result into coordinates of the (t+1)-th LiDAR map, to thereby generate a converted (t+1)-th annotation result and record the converted (t+1)-th annotation result in the specific LiDAR map.

9. The method of claim 1, wherein, at the step of (a), the computing device generates the specific LiDAR map by applying a LiDAR SLAM algorithm to the plurality of specific LiDAR point cloud data.

10. The method of claim 1, wherein, at the step of (a), each of the specific LiDAR frames corresponding to each of the specific LiDAR point cloud data is associated with each of location information of the plurality of specific LiDAR frames, wherein the location information includes information on 6-DOF (6 degrees of freedom).

11. A computing device for annotation based on a LiDAR map, comprising:

at least one memory that stores instructions; and at least one processor configured to execute the instructions to perform processes of: (I) on condition that each of datasets for each of driving routes has been recorded in a database, in response to acquiring a specific dataset among the datasets, generating a specific LiDAR map and a specific key frame trajectory using a plurality of specific LiDAR point cloud data included in the specific dataset, wherein each of the datasets includes (1) each of LiDAR point cloud data corresponding to each of LiDAR frames and (2) each of camera images corresponding to each of camera frames, acquired by a predetermined criterion while driving each of the driving routes; and (II) allowing a specific key frame, which is at least part of a plurality of key frames included in the specific key frame trajectory, to be annotated, thereby generating an annotation result and thus recording the annotation result in the specific LiDAR map.

12. The computing device of claim 11, wherein, at the process of (I), the processor selects at least part of a plurality of specific LiDAR frames as the plurality of key frames by referring to each location information of the plurality of specific LiDAR frames corresponding to the plurality of specific LiDAR point cloud data, and generates the key frame trajectory to be a path moving along the plurality of key frames.

13. The computing device of claim 12, wherein, at the process of (I), for each of the specific LiDAR frames, the processor performs at least one of sub-processes of: (i) determining whether a distance between a k-th point corresponding to a k-th specific LiDAR frame and a (k+1)-th point corresponding to a (k+1)-th specific LiDAR frame exceeds a preset threshold distance, and (ii) determining whether a pose change rate between a k-th pose corresponding to the k-th specific LiDAR frame and a (k+1)-th pose corresponding to the (k+1)-th specific LiDAR frame exceeds a present threshold pose change rate, to thereby select the plurality of key frames.

14. The computing device of claim 11, wherein the process of (II) includes processes of: (II-1) allowing a t-th key frame among the plurality of key frames that are part of the specific key frame trajectory to be selected as the specific key frame; (II-2) in response to selecting the t-th key frame, instructing a display device to display a t-th LiDAR map and one or more t-th camera images corresponding to location information of the t-th key frame; (II-3) allowing a t-th annotating process on said at least part of a plurality of objects included in the t-th LiDAR map to be performed by referring to at least one of the t-th LiDAR map and the t-th camera images; and (II-4) converting coordinates of a t-th annotation result into coordinates of the t-th LiDAR map, to thereby generate a converted t-th annotation result and record the converted t-th annotation result in the specific LiDAR map.

15. The computing device of claim 14, wherein, at the process of (II-3), in response to selecting a t-th object among the plurality of objects, the processor generates a (t_1)-st annotation box with a certain range based on the t-th object, and then instructs the display device to display the (t_1)-st annotation box, to thereby allow the t-th annotating process on the t-th object to be performed.

16. The computing device of claim 15, wherein the processor displays a (t_2)-nd annotation box corresponding to the (t_1)-st annotation box by projecting the (t_2)-nd annotation box on a region of the t-th camera image corresponding to a range of coordinates of the t-th LiDAR map where the (t_1)-st annotation box is located, wherein the processor allows a second shape of the (t_2)-nd annotation box to be changed according to a change in a first shape of the (t_1)-st annotation box by referring to a relation between a (t_1)-st shooting angular range of the t-th LiDAR map and a (t_2)-nd shooting angular range of the t-th camera image.

17. The computing device of claim 15, wherein, in response to selecting the t-th object among the plurality of objects, the processor instructs the display device to further display a detailed area in which at least one of a planar portion, a side portion, and a front portion of the t-th object is enlarged, wherein the processor generates at least one (t_3)-rd annotation box in which at least one of a planar portion, a side portion and a front portion of the (t_1)-st annotation box is enlarged and instructs the display device to display the (t_3)-rd annotation box through the detailed area.

18. The computing device of claim 14, wherein, after the process (II-4), the process of (II) includes processes of: (II-5) in response to selecting a (t+1)-th key frame, converting coordinates of the t-th annotation result, having been converted into coordinates of the t-th LiDAR map, into coordinates of the (t+1)-th LiDAR map, thereby generating a converted t-th annotation result, and then applying the converted t-th annotation result to the (t+1)-th LiDAR map, and instructing the display device to (1) display the (t+1)-th LiDAR map with the t-th annotation result applied thereto and (2) display the t-th annotation result on one or more (t+1)-th camera images by referring to a matching relation between the (t+1)-th LiDAR map and the (t+1)-th camera images; (II-6) allowing a (t+1)-th annotating process on said at least part of a plurality of objects included in the (t+1)-th LiDAR map to be performed by referring to at least one of the (t+1)-th LiDAR map and the (t+1)-th camera images; and (II-7) converting coordinates of a (t+1)-th annotation result into coordinates of the (t+1)-th LiDAR map, to thereby generate a converted (t+1)-th annotation result and record the converted (t+1)-th annotation result in the specific LiDAR map.

19. The computing device of claim 11, wherein, at the process of (I), the processor generates the specific LiDAR map by applying a LiDAR SLAM algorithm to the plurality of specific LiDAR point cloud data.

20. The computing device of claim 11, wherein, at the process of (I), each of the specific LiDAR frames corresponding to each of the specific LiDAR point cloud data is associated with each of location information of the plurality of specific LiDAR frames, wherein the location information includes information on 6-DOF (6 degrees of freedom).

* * * * *